United States Patent [19]

Koori et al.

[11] Patent Number: 4,800,497
[45] Date of Patent: Jan. 24, 1989

[54] CLUTCH PRESSURE CONTROL APPARATUS

[75] Inventors: Yasuo Koori, Toyota; Tsutomu Mitsui, Chiryu, both of Japan

[73] Assignee: Aisin Seiki Kabushiki Kaisha, Kariya, Japan

[21] Appl. No.: 845,329

[22] Filed: Mar. 28, 1986

[30] Foreign Application Priority Data

Mar. 28, 1985 [JP] Japan .................. 60-62134

[51] Int. Cl.$^4$ ............................. B60K 41/28
[52] U.S. Cl. .................. 364/424.1; 74/866; 192/0.092
[58] Field of Search .............. 364/424.1; 192/109 F, 192/0.075, 0.076, 0.092, 3.31, 0.03; 74/866, 751, 752 A

[56] References Cited

U.S. PATENT DOCUMENTS

| | | | |
|---|---|---|---|
| 4,200,175 | 4/1980 | Dick | 192/0.092 |
| 4,343,387 | 8/1982 | Hofbauer | 192/0.092 |
| 4,428,467 | 1/1984 | Hiramatsu | 192/0.092 |
| 4,475,637 | 10/1984 | Oguma et al. | 192/0.092 |
| 4,633,985 | 1/1987 | Leorat | 192/3.31 |
| 4,680,988 | 7/1987 | Mori | 74/866 |

Primary Examiner—Gary Chin
Attorney, Agent, or Firm—Burns, Doane, Swecker & Mathis

[57] ABSTRACT

In a clutch pressure control apparatus wherein clutch engagement pressure is automatically controlled according to engine speed based on a first function, engagement shock may occur due to an excessive clutch pressure in a case where the acceleration pedal is depressed with the transmission being placed in a NEUTRAL position and being shifted to a running position. To solve this problem, the apparatus comprises a controller including a second function. When an actual engine speed at the initial clutch engagement exceeds an allowable engine speed, clutch pressure is first set to a temporary low value not exceeding the allowable engine speed, and then while incorporating the second function, is allowed to approach that value to be determined according to actual engine speed by the first function. The second function is of clutch pressure and time, incorporating accelerator stroke as a parameter, or such that is provides an auxiliary parameter defined by accelerator stroke to modify an actual engine speed signal to be inputted to the first function.

12 Claims, 3 Drawing Sheets

CLUTCH PRESSURE CONTROL APPARATUS

BACKGROUND OF THE INVENTION

1. Field of the Invention

The present invention relates to an improvement of an automatic clutch pressure control apparatus. Conventionally, clutch pressure control apparatuses are made up of a function generator for generating various clutch pressure control signals according to engine rotational speed $N_e$ and a start switch for activating the function generator by detecting transmission shift level position and accelerator pedal depression stroke (see FIG. 1) In this apparatus, if an accelerator pedal is depressed after the transmission shift lever has been set to DRIVE, LOW or REVERSE, the start switch activates the function generator to generate a clutch pressure control signal according to an actual engine speed $N_e$ in accordance with the function of clutch pressure and engine speed. In response to this clutch control signal, an appropriate clutch pressure is determined to engage the clutch.

2. Discussion of the Prior Art

In the prior-art clutch pressure control apparatus, whenver the accelerator pedal is depressed, since the clutch pressure increases with increasing engine speed, it is possible to smoothly engage the clutch. However, there still exists a problem in that when the accelerator pedal is depressed with the transmission shifted to NEUTRAL after which the transmission is shifted to DRIVE, LOW or REVERSE at high engine speed, a control signal representative of a high clutch control pressure is delivered from the function generator, such that the clutch is engaged abruptly under high clutch pressure whereby a shock is produced due to an abrupt increase of transmission torque (See FIG. 2).

SUMMARY OF THE DISCLOSURE

With these problems in mind, therefore, it is a primary object of the present invention to provide a clutch pressure control apparatus which can prevent clutch engagement shock from being produced even if the transmission is shifted from NEUTRAL to DRIVE, LOW or REVERSE after the accelerator pedal has been depressed to cause, for example, a high engine rotational speed.

Other objects will become apparent in the entire disclosure.

To achieve the above-mentioned object, the clutch pressure control apparatus according to the present invention comprises: (a) a first function generator for generating a clutch pressure control signal in accordance with a first function such that a clutch pressure control signal is definitely determined by an engine rotational speed signal and an accelerator depression stroke signal;

(b) a controller including a second function generator for providing another clutch pressure control signal such that when actual engine speed at an initial clutch engagement exceeds a predetermined allowable engine speed limit, clutch pressure is first set to a temporary low value not exceeds the allowable engine speed limit and then, while incorporating a second function, is allowed to approach that value determined by the first function according to the actual engine speed signal; and (c) a start switch for detecting accelerator depression stroke and transmission shift position and outputting a start signal to start to operate said controller when the transmission is shifted to a running position and an accelerator pedal is depressed.

The allowable engine speed limit is a value not less than the idling engine speed but low enough to avoid producing shock when the clutch is engaged in response to a clutch pressure control signal determined by the first function generator.

In one preferred embodiment, the second function is such that clutch pressure increases as time proceeds in response to the start signal from said start switch incorporating the accelerator depression stroke as the parameter. Since the clutch pressure can be adjusted according to the accelerator depression stroke, it is possible to finely control clutch engagement pressure pursuant to the driver's intent. The controller compares the determined clutch pressure of the first function with that of the second function and generates a clutch pressure control signal determined by the first function when the clutch pressure of the first function is below or equal to that of the second function, whereas the controller generates a clutch pressure control signal determined by the second function when the clutch pressure of the second function is lower than that of the first function.

In another embodiment, the second function may be an auxiliary parameter such that it outputs a function to modify the actual engine speed signal, this function being a function of the accelerator stroke, e.g., a function which increases with an increasing accelerator depression stroke. In the embodiment, since the auxiliary parameter is the function of the accelerator stroke, the driver's intent can be readily reflected. Namely, since the actual engine speed signal can be modified according to the accelerator depression stroke, it is thereby possible to control clutch engagement pressure pursuant to the driver's intent. The controller generates a clutch pressure control signal as a temporary low value not exceeding the allowable engine speed limit first corresponding to a predetermined idling engine speed signal (i.e., by regarding it as the actual engine speed signal) and thereafter asymptotically corresponding to an actual engine speed in accordance with said first function while allowing the temporary (idling) engine speed signal to approach the actual engine speed signal by modifying the temporary engine speed signal with the auxiliary parameter delivered from the second function generator.

In the clutch pressure control apparatus according to the present invention, the operation is as follows: in the case where the accelerator pedal is normally depressed after the transmission has been shifted to DRIVE, LOW or REVERSE, engine speed always gradually increases beginning from the idling speed at the vehicle start without depending upon the second function generator even if the controller starts to operate by the start switch. Therefore, it is possible to output an appropriate clutch pressure control signal, in response to the actual engine speed signal, from the first function generator. Further, since the clutch pressure control signals change also according to the accelerator depression stroke, the clutch pressure increases with an increasing engine speed, so that it is possible to engage the clutch smoothly without producing engagement shock.

Being different from the above ordinary vehicle starting, in a case where the transmission shift lever is set to the DRIVE, LOW or REVERSE range after the accelerator pedal has been depressed to increase engine speed at the NEUTRAL range, the controller starts to operate in response to a start signal from the start switch, and further the second function generator operates. That is, when the controller discriminates that a clutch pressure signal selected by the first function generator is excessively high to produce clutch engagement shock, the clutch pressure signal is determined according to the second function generator whereby the output signal is caused to asymptotically approach an ideal clutch pressure control signal which corresponds to the actual engine speed signal at the first function generator. Since the second function is so determined, by reference to the accelerator depression stroke which reflects the driver's intent, as to apply an appropriate clutch engagement pressure as in the first function, it is possible to control the clutch engagement without providing any discomfort to the driver. Owing to the above clutch pressure control, when the clutch pressure becomes equal to that to be selected according to the actual engine speed signal by the first function, the clutch pressure control signal in accordance with the first function is outputted from the controller.

Operation of the first embodiment in the case of including the second function with a time parameter such that the clutch pressure control signal increases as time proceeds will be described herein below. When the accelerator pedal is normally depressed after the transmission has been shifted from NEUTRAL to, e.g., DRIVE, since the clutch pressure control signal of the second function is usually higher than that of the first function at the vehicle start, the lower clutch pressure control signal from the first function generator is selected and held (or stored) in the controller, so that the clutch pressure control signals determined in accordance with the first function are outputted.

However, when the transmission is shifted from NEUTRAL to, e.g., DRIVE after the accelerator pedal has been depressed, since the clutch pressure control signal of the first function is generally higher than that of the second function at the vehicle start, the lower clutch pressure control signal from the second function is selected and held (or stored) in the controller, so that clutch pressure control signals determined in accordance with the second function are outputted taking accelerator depression stroke into consideration. Owing to the clutch pressure control, when the output of the second function becomes equal to that established by the first function, the clutch pressure control signal based on the first function is outputted from the controller.

Operation of the second embodiment in the case where a second function such as to modify the measured (actual) engine speed signal is selected as the second function will be as follows: When the accelerator pedal is normally depressed after the transmission has been shifted from NEUTRAL to, e.g., DRIVE, since the actual engine speed signal is substantially equal to an idling engine speed at the vehicle start, the engine speed signal is not specially changed, and therefore the clutch pressure control signal is outputted from the controller in accordance with the first function.

However, when the transmission is shifted from NEUTRAL to, e.g., DRIVE after the accelerator pedal has been depressed, the controller regards the predetermined idling speed signal as the actual measured engine speed and delivers the first function output (equal to the predetermined idling speed signal, instead of the actual signal) as the clutch pressure control signal while this output signal is caused to approach the actual speed by means of an auxiliary parameter delivered from the second function. This axuiliary parameter is defined by the accelerator depression stroke.

According to this embodiment, in the case where the engine speed exceeds the idling engine speed at the vehicle start, it is possible to engage the clutch quickly and smoothly pursuant to the driver's intent owing to the operation of the controller including the second function without applying clutch engagement shock to the vehicle or driver.

BRIEF DESCRIPTION OF THE DRAWINGS

The features and advantages of the clutch pressure control apparatus according to the present invention over the prior-art apparatus will be more clearly appreciated from the following description taken in conjunction with the accompanying drawings in which.

DETAILED DESCRIPTION OF THE PREFERRED EMBODIMENTS

The embodiments of the present invention will be described hereinbelow with reference to the attached drawings.

Figure 1:
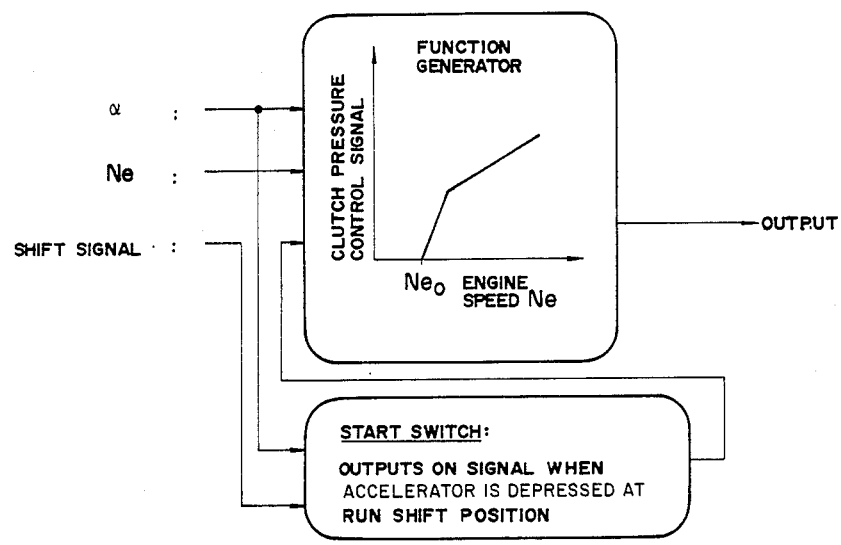
FIG. 1 is a schematic block diagram for assistance in explaining the functions of the prior-art clutch pressure control apparatus.
Figure 2:
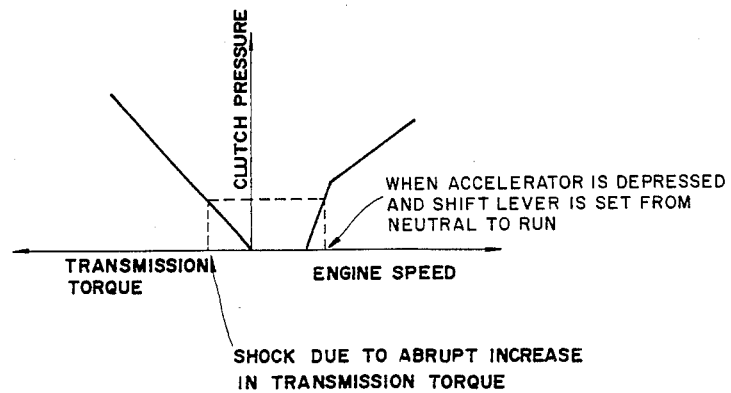
FIG. 2 is a graphical representation showing the relationship between clutch pressure and engine speed, transmission torque for assistance in explaining clutch engagement shock in the prior-art apparatus.
Figure 3:
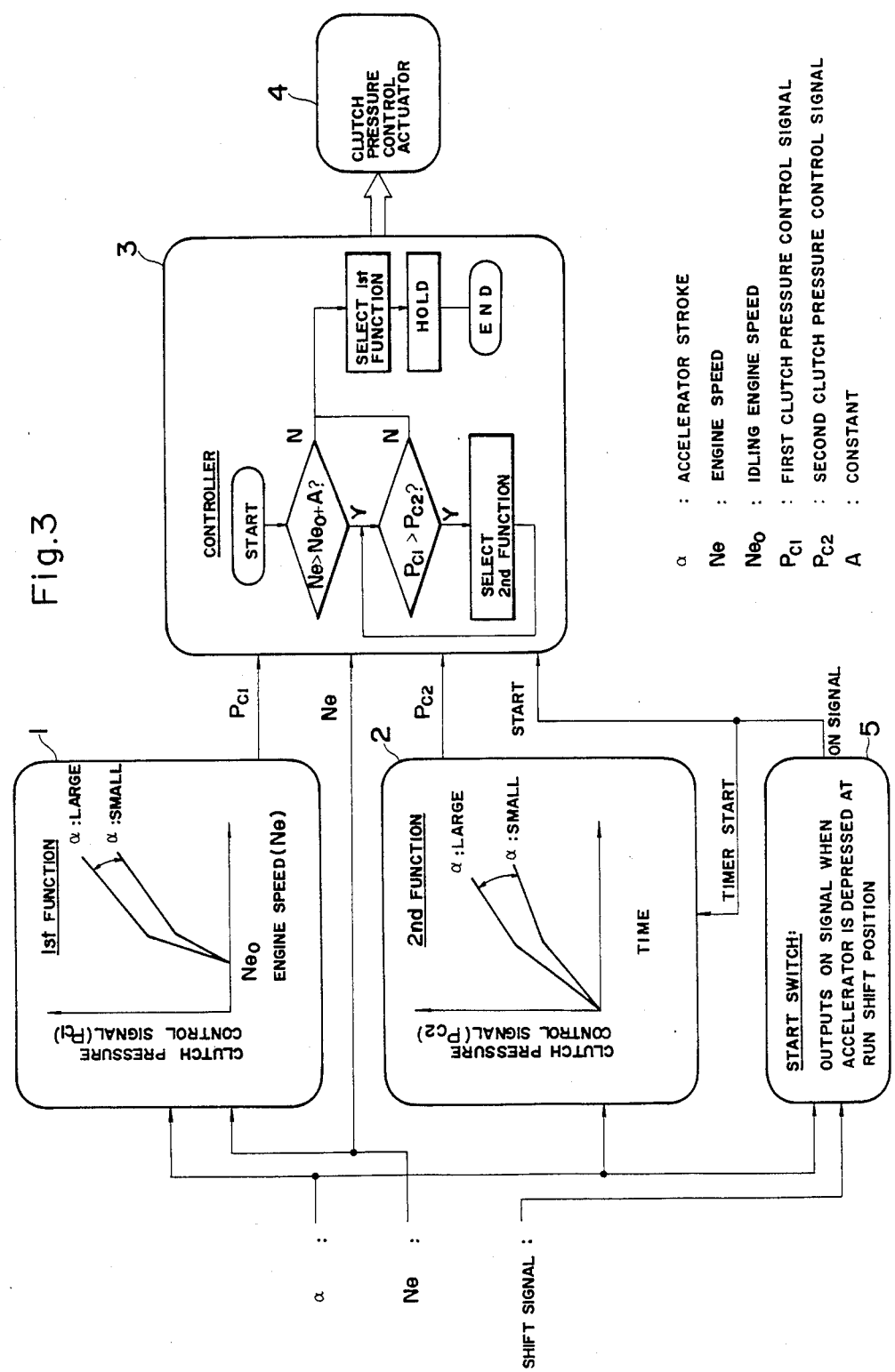
FIG. 3 is a schematic block diagram showing a first embodiment of the present invention.

The embodiment shown in FIG. 3 comprises a first function generator and a second function generator. In this embodiment a clutch pressure control signal is generated from the second function generator until a certain condition is met. IN the second function operator, clutch pressure increases as time proceeds as shown.

In the drawings, the reference numeral 1 denotes a first function generators for generating a first clutch control signal $P_{c1}$ in response to an actual engine rotational speed $N_e$ and an accelerator pedal depression stroke $\alpha$. The first function is composed of a group of curves each defined by an amount of an accelerator depression stroke $\alpha$ as the parameter. Namely, in the group of curves, the gradients of the clutch pressure control signal $P_{c1}$ versus the engine speed $N_e$ increase with the increasing accelerator depression stroke $\alpha$. The above gradients of the clutch pressure control signal $P_{c1}$ are so determined as to engage the clutch in line with the driver's intent. All of the curves indicative of the clutch pressure rise, beginning from a defined idling engine speed $N_{eo}$, sharply with the increasing engine speed to certain determined values and thereafter gently so as to quickly and smoothly engage the clutch.

The reference numeral 2 denotes a second function generator, which is activated in response to a start signal (timer start signal) from a start switch 5 (to be described later) and which generates a second clutch control signal $P_{c2}$ indicative of the clutch pressure increasing as time proceeds and as a function of the accelerator depression stroke $\alpha$. The second function is composed of a group of curves each defined by an amount of an accelerator depression stroke $\alpha$ as the parameter. Namely, as is the case with the first function generator, the gradients of the clutch pressure signal $P_{c2}$ versus time increases with the increasing accelerator depression stroke $\alpha$. Further, it is also possible to determine the gradients pursuant to the driver's intent. All of the curves indicative of the clutch pressure rise, beginning from the time whereat a start signal is applied from the start switch 5 thereto (i.e., zero time), sharply with proceeding time to certain determined values and thereafter gently so as to provide the same clutch engagemtn effect as in the first function generator 1.

The reference numeral 3 denotes a controller to be started operation in response to a start signal ON of the start switch 5, to which the actual engine speed signal $N_e$, the first-function signal $P_{c1}$, and the second-function signal $P_{c2}$ are all inputted. The controller 3 outputs either one of the clutch pressure control signals $P_{c1}$ or $P_{c2}$ to a clutch pressure control actuator 4 on the basis of an actual engine speed signal $N_e$ obtained at the initial clutch engagement, that is, at a time where a start signal is inputted thereto from the start switch 5. Further, it is also possible to dispose the second function generator within the controller 3. The condition under which the second function is selected consists in that the actual engine speed signal $N_e$ exceeds an allowable engine speed limit. In practice, the allowable engine speed limit is a sum $(N_{eo} + A)$ of an idling speed $N_{eo}$ and a constant A. This allowable engine speed limite $N_{eo} + A$ is a lowest engine speed limit at which a shock is produced when the clutch is engaged under the first-function signal $P_{c1}$. Further, the condition under which the second function 2 is selected and held consists in that the second-function signal $P_{c2}$ is lower than the first-function signal $P_{c1}$. Furthermore, the condition under which the first function 1 is selected and held consists in the case where the actual engine speed Ne is lower than the allowable engine speed limit $N_{eo} + A$, or in the case where the second-function signal $P_{c2}$ is higher than the first-function signal $P_{c1}$. The first condition occurs when the accelerator pedal is depressed with the transmission shift lever set to DRIVE, LOW or REVERSE. The second condition occurs when the second-function signal $P_{c2}$ exceeds the first-function signal $P_{c1}$ after a certain period of time has elapsed at a relatively low actual engine speed $N_e$.

The reference numeral 5 denotes a start switch. The condition under which the start switch 5 generates a start signal consists in the case where the accelerator pedal is depressed and additionally a transmission shift lever is set to a running position such as DRIVE, LOW or REVERSE, irrespective of the order of the accelerator pedal depression and the transmission lever shifting to the running positions.

The operation of the clutch pressure control apparatus as shown in FIG. 3 will be described hereinbelow.

The first function generator 1 selects a clutch pressure control signal $P_{c1}$ according to an inputted accelerator depression stroke $\alpha$ and an inputted actual engine signal $N_e$ from the group of first-function curves, and outputs a selected control signal $P_{c1}$ to the controller 3. If $\alpha$ and $N_e$ vary, the outputted control signal $P_{c1}$ varies.

The start switch 5 discriminates the vehicle start condition on the basis of the inputted accelerator depression stroke signal $\alpha$ and the inputted transmission shift signal, and outputs a start signal to the second function generator 2 and the controller 3 when the accelerator pedal stroke $\alpha$ meets the condition of start and the transmission lever is shifted from NEUTRAL to DRIVE, LOW or REVERSE. In response to this start signal, the second function generator 2 and the controller 3 both start to operate. The second function generator 2 selects a curve corresponding to an accelerator depression stroke $\alpha$ from the group of curves and further outputs to the controller 3 a series of control signals $P_{c2}$ which increase with proceeding time. The controller 3 receives an actual engine speed signal $N_e$ at the vehicle start. When the engine speed signal $N_e$ is not higher than the allowable engine speed limit $N_{eo} + A$, the first function system 1 is selected, and a first-function signal $P_{c1}$ is outputted to the clutch pressure control actuator 4.

When, at the start, an actual engine speed signal $N_e$ is higher than the allowable engine speed limite $N_{eo} + A$, both the control signals $P_{c1}$ and $P_{c2}$ of both the function generators 1 and 2 are compared with each other. If the first-function signal $P_{c1}$ is equal to or lower than the second-function signal $P_{c2} (P_{c1} \leq P_{c2})$, the first function system 1 is selected and held; if this relation is not met, the second-function generator 2 is selected, the selected signals being applied to the clutch pressure control actuator 4. The above operation cycle is repeated until the relation $P_{c1} \leq P_{c2}$ can be satisfied. Upon the time whereat such relation is established i.e., the second-function signal $P_{c2}$ exceeds the first-function signal $P_{c1}$, the first-function generator 1 is selected again and thereafter the control operation of the present invention is completed. That is, thereafter, the first clutch control signal $P_{c1}$ of the first function generator 1 is applied to the clutch pressure control actuator 4 as the clutch control signal.

Figure 4:
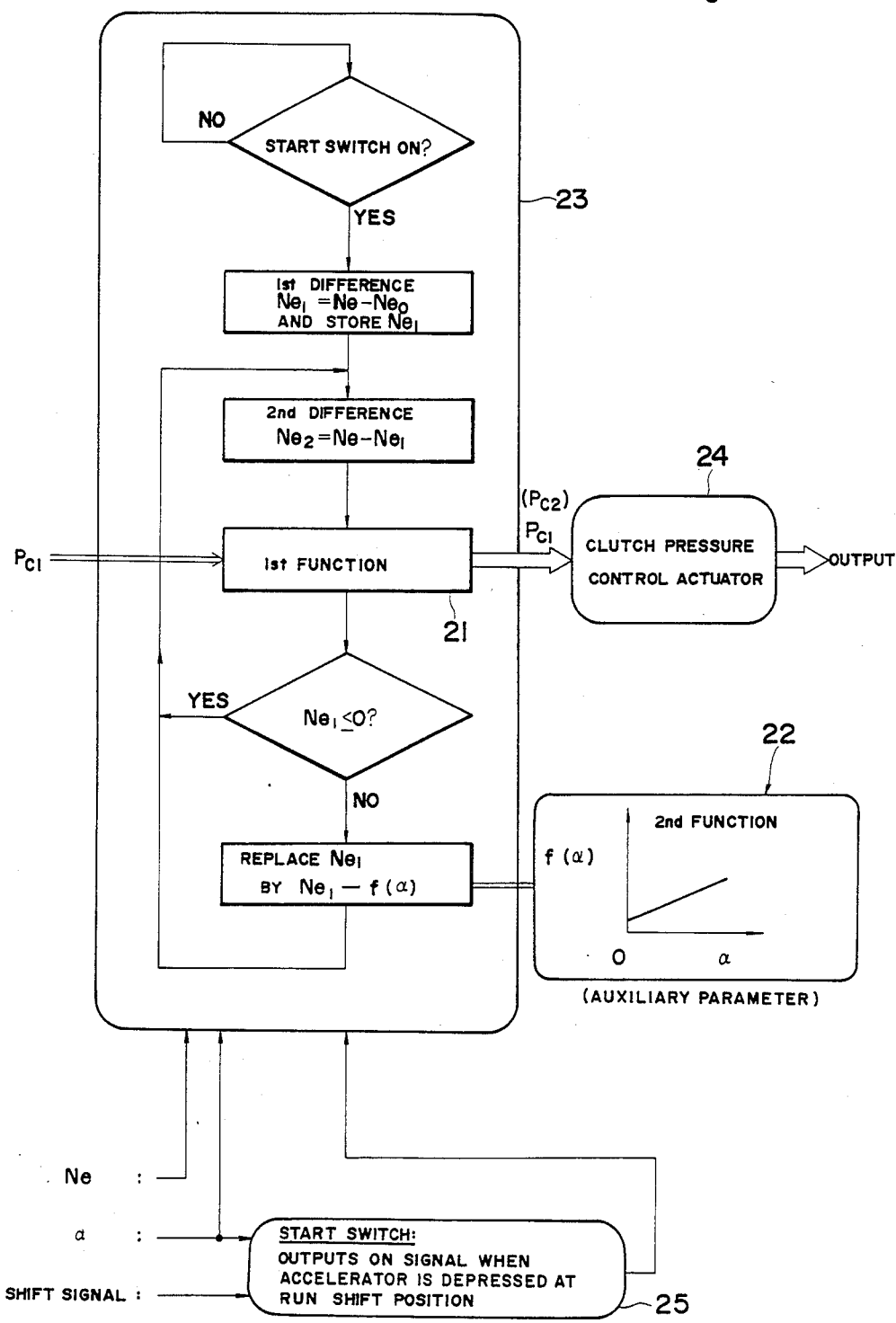
FIG. 4 is a schematic block diagram showing a second embodiment of the present invention.

FIG. 4 shows a second embodiment of the present invention, in which an actual engine speed inputted to the first function generator in response to the start signal from the start switch is first regarded as a signal assumed to be representative of the defined idling engine speed (referred to as "idling speed signal"), and clutch pressure control signals ($P_{c1}$ and $P_{c2}$) are outputted from the first function generator while allowing the idling speed to approach the actual engine speed on the basis of an auxiliary parameter to reduce the difference between the idling speed signal and the actual engine speed signal generated from the function generator.

In FIG. 4, the reference numeral 21 denotes a first function generator; the numeral 24 denotes a clutch pressure control actuator, and the numeral 25 denotes a start switch. The functional effects of these elements are substantially the same as with the first embodiment shown in FIG. 3, and any detailed description of them is eliminated.

The second function generator 22 generates an auxiliary parameter $f(\alpha)$ as a subtrahend equivlanet to engine speed in response to the accelerator depression stroke $\alpha$. This auxiliary parameter $f(\alpha)$ increases with an increasing accelerator depression stroke $\alpha$ so as to control the clutch pressure in line with driver intent.

The controller 23 starts to operate in response to a start signal from the start switch 5 and receives an actual engine speed signal $N_e$ and an accelerator depression stroke signal $\alpha$ as data.

Upon starting in response to the start signal, the controller 23 calculates a first difference $N_{e1}$ between the actual engine speed signal $N_e$ and a defined idling engine speed signal $N_{eo}$, and after having stored the calculated engine speed difference signal $N_{e1}$, further calculates a second difference $N_{e2}$ between a temporary actual engine speed signal $N_e'$ and $N_{e1}$ to apply this calculated temporary engine speed difference signal $N_{e2}$ to the first function generator 1. (Namely, this corresponds to the case where in the first function of FIG. 3 the signal "$N_e$" is replaced by $N_{e2}$). The first function generator 1 determines a clutch pressure control signal $P_{c1}$ corresponding to the inputted accelerator stroke signal $\alpha$ and the calculated temporary engine speed difference signal $N_{e2}$ and outputs a control signal representative thereof. Further, the controller 23 discriminates whether the calculated difference $N_{e1}$ is equal to or less than zero ($N_{e1} \leq 0$). If YES, since indicates that there exists no significant difference between the defined idling speed signal $N_{eo}$ and the actual engine speed $N_e$(at idling), the controller 23 further calculates a difference $N_{e2} = N_e' - N_{e1}$ where $N_e'$ represents a temporary actual engine speed at the time of this calculation and outputs an engine speed signal $N_{e2}$ to the first function generator 1. If the calculated difference $N_{e1}$ is more than zero, since this indicates that there still exists a significant difference between the defined idling speed $N_{eo}$ and the actual engine speed $N_e$, the controller 23 subtracts the auxiliary parameter $f(\alpha)$, a function of the accelerator depression stroke $\alpha$, of the second function, from the difference $N_{e1}$ and calculates again the difference $N_{e2}$ between a temporary actual engine speed signal $N_e'$, and the subtracted value $N_{e1}$. In this case, the difference $N_{e2}$ is modified by $f(\alpha)$ wherein the ordinate $N_e$ at the first function is axially shifted. That is to say, the engine speed is adjusted to reach an aimed appropriate engine speed by modifying the first function by the auxiliary parameter $f(\alpha)$ of the second function generator 22. Thus, when the ordinate $N_e$ of the first function generator 21 reaches the aimed appropriate position, the temporary actual engine speed signal $N_e$ which has been temporarily received by the controller 23 is delivered to the first function generator 21 without this modification. Namely, when the difference $N_{e1}$ between the defined idling speed ($N_{eo}$) and the actual speed ($N_e$) reaches zero, the difference $N_{e2}$ becomes equal to engine speed ($N_e$), and the controller 23 generates a clutch pressure control signal corresponding to the actual engine speed ($N_e$) in accordance with the first function as with the normal case.

Further, in the above embodiments, although the first function generator and the second function generator are disposed separately from the controller, in practice these function generators are incorporated in the controller, in particular when the controller is made up of a microprocessor.

It should be noted that modifications to these embodiments may be made without departing from the gist and scope of the present invention as herein disclosed and claimed hereinbelow.

What is claimed is:

1. A clutch pressure control apparatus which comprises:
   (a) a first function generator for generating a clutch pressure control signal in accordance with a first function such that a clutch pressure control signal $P_{c1}$ is definitely determined as a function of an engine rotational speed signal and an acclerator pedal stroke signal;
   (b) a controller including a second function generator for providing a second clutch pressure control signal $P_{c2}$ in accordance with a second function such that when actual engine speed at an initial clutch engagement phase at which a clutch is entering a half-clutch state exceeds a predetermined engine speed limit, which does not provide shock when the clutch is engaged, said second clutch pressure control signal is first set to a temporary low value corresponding to an engine speed not exceeding the predetermined engine speed limit and then in accordance with said second function is allowed to approach a value determined by the first function according to the actual engine speed signal; and
   (c) a start switch for detecting accelerator pedal stroke and transmission shift position and outputting a start signal to start to operate said controller when transmission is shifted to a running position and the accelerator stroke meets a condition for start, wherein the second clutch pressure control signal $P_{c2}$ increases as the time proceeds starting from said outputting of the start signal;

said controller receiving control signal $P_{c1}$, the accelerator pedal stroke signal, the start signal and the engine rotational speed and selecting the control signal $P_{c2}$ when the engine speed signal is higher than the predetermined engine speed limit and $P_{c1}$ is higher than $P_{c2}$, or selecting the control signal $P_{c1}$ when the engine speed signal is not higher than the predetermined engine speed limit or $P_{c1}$ is not higher than $P_{c2}$ with the control signal $P_{c1}$ being maintained until the start signal is outputted again.

2. The clutch pressure control apparatus as set forth in claim 1, wherein in said second function, said second clutch pressure control signal increases as time proceeds in response to the start signal from said start switch, the second clutch pressure control signal being also defined by an accelerator pedal stroke signal, said controller comparing both the clutch pressure control signals determined in accordance with both the first and second functions and generating a resultant clutch pressure control signal representative of a lower clutch pressure control signal between the two compared control signals.

3. The clutch pressure control apparatus as set forth in claim 1, wherein said second function is such that it generates auxiliary parameter to modify the actual engine speed signal, to be inputted in the first function generator, as a function of the accelerator pedal stroke, said controller regarding the temporary low value as the actual engine speed signal to be inputted to the first function, thereby generating a clutch pressure control signal first corresponding to the temporary low value, and thereafter asymptotically approaching the actual engine speed based on said first function.

4. The clutch pressure control apparatus as set forth in claim 2, wherein said temporary low value is defined by the second function.

5. The clutch pressure control apparatus as set forth in cliam 3, wherein said temporary low value is defined so as to correspond to a predetermined idling engine speed.

6. The apparatus as set forth in claim 1, wherein the controller a program comprising following steps is effected:
   (a) discriminating if an engine speed signal $N_e$ is larger than the predetermined allowable engine speed limit ($N_{eo} + A$) where $N_{eo}$ is the predetermined idling engien speed signal and A is a predetermined value;
   (b) if YES at the step (a), discriminating if $P_{c1} > P_{c2}$ where $P_{c1}$ and $P_{c2}$ are outputs of the first and second function generators, respectively;

(c) if YES at the step (b), selecting the output $P_{c2}$ of the second function; and
(d) if NO at steps (a) and (b), selecting the output $P_{c1}$ of the first function.

7. The apparatus as set forth in claim 3, wherein the controller:
   (i) establishes a first difference between an actual engine speed signal and the temporary low value;
   (ii) stores the first differences;
   (iii) thereafter establishes a second difference between a an actual engine speed signal at this step (iii) and the first difference; and
   (iv) delivers the second difference to the first function generator.

8. The apparatus as set forth in claim 7, wherein the controller further;
   (v) after the step (iv), discriminating at the first difference if the actual engine speed signal is equal to or lower than the temporary low value;
   (vi) if NO at the step (v) replaces the first difference by a modified value resulting by subtracting from the first difference an auxiliary parameter provided in accordance with the second function and as a function of the accelerator pedal stroke; and
   (vii) delivers the modified value to replace the first difference in the step.

9. The apparatus as set forth in claim 8, wherein the controller further:
   (a) establishing a difference $N_{e1} = N_e - N_{e0}$ and store $N_{e1}$ where $N_e$ represents an actual engine speed signal and $N_{e0}$ represents a predetermined idling engine speed;
   (b) after the step (a) establishing a difference $N_{e2} = N_e' - N_{e1}$ where $N_e'$ represents an actual engine speed signal at a time of the step (b):
   (c) after the step (b), establishing said clutch pressure control signal $P_{c1}$ based on the first function;
   (d) after the step (c), discriminating if $N_{e1}' = 0$;
   (e) if NO at the step (d), replacing $N_{e1}$ by $N_{e1} - f(\alpha)$ where $f(\alpha)$ is said auxiliary parameter to provide the modified value, and delivering the resultant modified value to the step (b) to replace the $N_{e1}$ at the step (b) for repeating the step (b); and
   (f) if YES at the step (d), delivering the present value $N_{e1}$ to the step (b) to repeat step (b).

10. The apparatus as set forth in claim 6, wherein the first function is a function of the engine speed and the accelerator pedal stroke provided that the gradient defined by the engine speed is increased as the accleratator pedal stroke increases.

11. The apparatus as set forth in claim 6, wherein the second function is a function of time and the accelerator pedal stroke provided that the gradient defined by the engine speed is increased as the accelerator pedal stroke increases.

12. The apparatus as set forth in claim 1, wherein the engine speed limit is a value not less than the idling engine speed but low enough not to provide shock when the clutch is engaged.

* * * * *